Sept. 26, 1944.    E. A. DAVIS    2,358,909
MANUFACTURE OF HOSE
Filed June 18, 1942
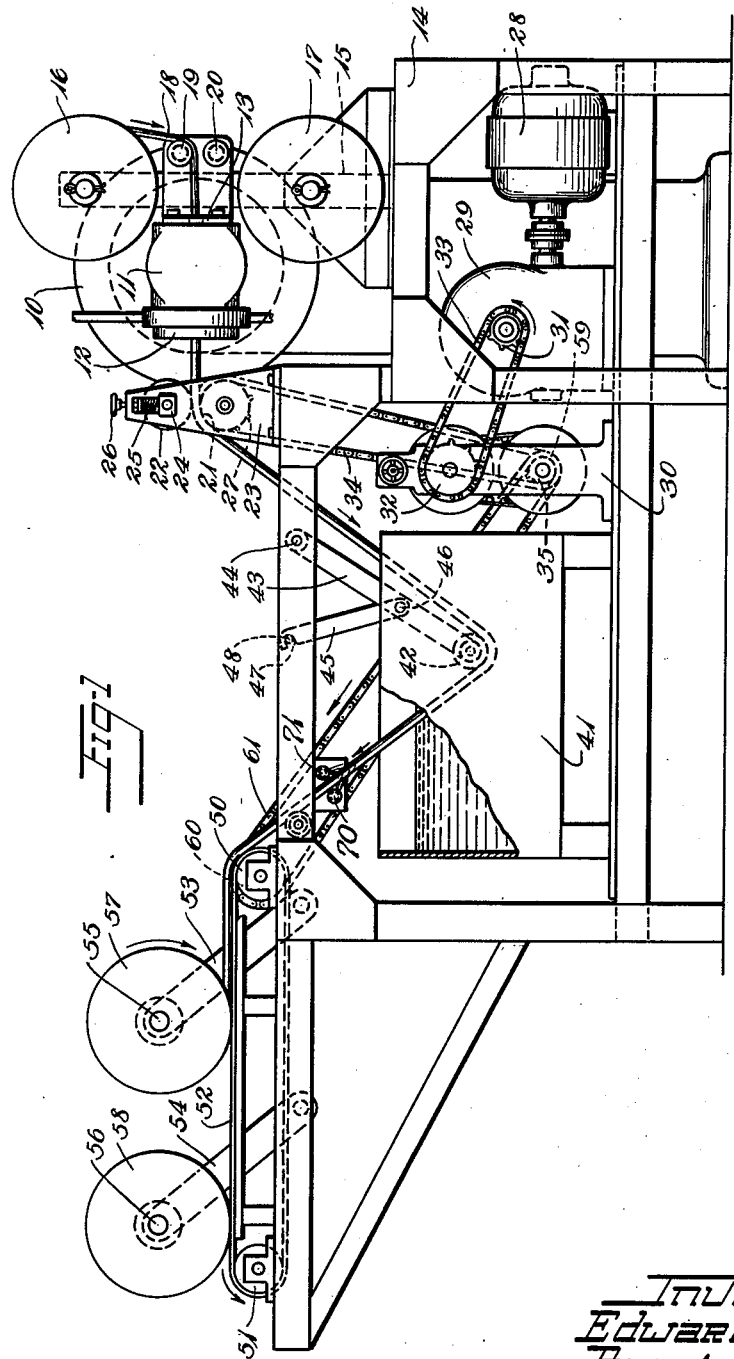

Patented Sept. 26, 1944

2,358,909

UNITED STATES PATENT OFFICE 2,358,909

MANUFACTURE OF HOSE

Edward A. Davis, Akron, Ohio, assignor to The
B. F. Goodrich Company, New York, N. Y., a
corporation of New York Application June 18, 1942, Serial No. 447,528

2 Claims. (Cl. 154—8)

This invention relates to the manufacture of hose and is especially useful in the manufacture of fire hose or other hose having a lining of rubber-like material and a jacket enclosing the same.

Heretofore in the manufacture of jacketed hose such as fire hose it has been customary to form a tubular lining of waterproof material such as rubber and to weave or braid a tubular jacket about the lining, thereafter vulcanizing the lining by inflating it within the jacket with steam. Where linings of unvulcanized rubber or other rubber-like material have been employed, difficulty has been experienced in handling and in stretching of the lining in drawing it into the jacket or in feeding it through the weaving or braiding machines for forming the jacket thereabout.

The present invention aims to overcome the foregoing and other difficulties and to provide an improved product.

The principal objects of the invention are to prevent permanent elongation and thinning of the plastic lining, to provide good adhesion and anchorage of the lining to the jacket, to provide a firm lining which can be readily fed through the weaving or braiding machine, or threaded through a preformed jacket and to provide improved apparatus and procedure.

These and other objects will appear from the following description and the accompanying drawing.

Of the drawing,

Fig. 1 is a side elevation of apparatus constructed in accordance with and embodying the invention, parts being broken away and parts shown in section.

Fig. 2 is a cross-sectional view of the hose lining.

Fig. 3 is a cross-sectional view of the completed hose.

In the practice of the invention in the preferred manner, a hose lining comprising a tube, preferably in flattened form, comprising plastic material not permanently stretchable to any considerable extent is formed with a coating or layer of permanently distortable plastic material which may be treated to reduce adhesiveness of its surface temporarily. A jacket may then be formed thereabout or placed thereover without permanently elongating the lining to any objectionable extent, and the plastic material may then be vulcanized and anchored to the jacket.

Referring to the drawing, the numeral 10 designates an extruding machine having an insulating head 11 which permits passage of a strip material therethrough while extruding a coating thereabout and for this purpose is equipped with a die 12 for forming the coating about the strip, and a guide 13 for the strip material aligned with the die, means being provided for forcing a supply of plastic material to the die. A frame 14 has a pair of standards such as 15 thereon adapted to support therebetween a plurality of reels 16, 17 of tubular lining material 18. The lining material is of semi-vulcanized or vulcanized rubber or other rubber-like material having great resistance to permanent elongation. The tubular lining material may have been formed by any suitable method such as by seaming together the edges of a flat strip, or by cut-seaming together superimposed flat strips, or by extrusion and prepared as by semi-curing or vulcanizing to provide resistance to permanent elongation. The lining tube is preferably of flattened form, as shown in Fig. 2 as this facilitates winding, reeling and forming of the coating thereabout, hereinafter to be described.

The flattened tubular lining 18 may be drawn alternately from either reel 16 or 17 and about guide rolls 19, 20 which align it with the guide 13. For drawing the material 18 through the extruding die and in synchronism with feed of plastic material therefrom, a pair of pinch rolls 21, 22 are rotatably supported in spaced-apart brackets such as 23. The upper roll 22 is journaled in bearing blocks, such as 24 vertically slidable in slots in the brackets toward and from roll 21 and is pressed toward the roll by coil springs, such as 25 and tension screws such as 26. Roll 21 has a sprocket 27 fixed thereto. For driving the roll, an electric motor 28 is mounted on frame 14 and drives a gear reducer 29 which in turn drives a variable speed transmission 30, which may be of the "Reeves" type, through sprockets 31, 32 and chain 33. Transmission 30, drives sprocket 27 through a chain 34 from a sprocket 35. The arrangement is such that motor 28 drives roll 21 at any desired speed to synchronize the feed of the lining 18 with the extrusion of material from die 12.

As the lining 18 passes through the extruding die, a layer 40 of unvulcanized plastic rubber-like material is formed thereon, and preferably completely thereabout to provide a coating for adhering and anchoring the lining to the jacket of the hose.

As the coated lining leaves the pinch rolls 21, 22 it is directed downwardly into a tank 41 of a dispersion of dusting material such as soapstone, mica, or the like in water. For this purpose, a guide roll 42 is rotatably mounted on a swing frame 43 pivoted at 44 on the frame 14. A strut 45 is pivoted at 46 to the swing frame and has a latch slot 47 for engaging a pin 48 on frame 14. The arrangement is such that when the strut engages the pin 48, roller 42 is submerged in the tank and holds a bight of the coated lining below the surface of the dispersion, and the strut may be unlatched for raising the roller 42 when threading the apparatus.

A pair of parallel drums 50, 51 are rotatably mounted on frame 14 and a conveyor belt 52 is entrained thereabout. A pair of swing frames 53, 54 are pivotally mounted on frame 14 and have removable bars 55, 56 at their free extremities for rotatably supporting stock shells 57, 58 in contact with the belt 52. The coated lining as it emerges from the tank 41 passes over roll 50 onto the conveyor 52 where it may be wound up about either stock shell 57 or 58. The conveyor is driven from the variable speed transmission 30 by sprockets 59 and 60, and chain 61. The arrangement is such that belt 52 is driven in synchronism with pinch rolls 21, 22 to prevent stretching of the material and the lining is rewound on the stock shell which is driven by frictional engagement with the belt.

For drying the water from the hose lining, air jets 70, 71 are arranged to be directed thereagainst as it leaves the tank 41 and the water is evaporated by the blast of air leaving a coating of dust on the plastic coating 40. This dust permits winding of the strip in convolutions on the shells 57, 58 without sticking of the convolutions to each other.

In practicing the invention, a vulcanized or semi-vulcanized flattened tubular lining 18 is supplied on reels 16, 17. The end of the lining is threaded through the extruder die. Plastic adhesive material is fed to the extruder die 12 and is formed in a coating 40 upon or about the flattened tube 18. The coated tube is drawn through the die 12 by pinch rolls 21, 22 and is conducted through the tank 41 where a coating of a dispersion of soapstone or a dispersion of other dusting material is deposited thereon. The coated strip is drawn onto conveyor 52 past air jets 70, 71 which dry the dispersion thereon and is wound up on one of the shells 57, 58. When the shell 57 or 58 is wound full, it is removed. A jacket 72 of textile or other suitable material is then formed thereabout progressively or a preformed jacket is drawn thereover. The vulcanized character of the lining 18 prevents excessive and permanent stretching of the lining during the forming of the jacket thereabout or during mounting of a preformed jacket thereon. The hose may then be vulcanized in any suitable manner. For example, steam or hot water may then be admitted to the interior of the hose to press the lining into contact with the jacket and supply vulcanizing heat. As the outer coating on the lining is unvulcanized, it is softened by the heat and flows between the meshes of the jacket, strongly anchoring and adhering the lining to the jacket. The coating of dust does not prevent such adhesion, as when the rubber material is softened, the dust merges therewith.

The invention is especially useful in the manufacture of flattened hose, although not limited to such use, as the lining 18 being vulcanized does not adhere to itself when flattened, and flattening facilitates handling and also passing the material through the extrusion head without employing a mandrel. Also, features of the invention are applicable to the manufacture of hose generally, including hose having a rubber covering applied over the jacket which preferably is effected prior to vulcanization of the rubber-like material of the lining in contact with the jacket.

Variations may be made without departing from the invention as it is defined by the following claims.

I claim:

1. Apparatus for making hose, said apparatus comprising means for applying a tubular coating of unvulcanized rubber-like material about the outer surface of a flattened tubular lining of at least partially vulcanized rubber-like material, means for drawing the tubular lining in flattened form through said applying means, said applying means comprising an extruding die and means for extruding said unvulcanized material therethrough, and means for applying a liquid dispersion of dust to the surface of the unvulcanized rubber-like material, said drawing means comprising roll means for advancing said lining through said extruding means and the dust-applying means in synchronism with the extruding speed of said extruding means.

2. Apparatus for making hose, said apparatus comprising a plurality of supply rolls for storing lengths of a flattened tubular lining of rubber-like material, an extruding head having means for guiding a tubular lining therethrough from either of said supply rolls and means for forming a coating of unvulcanized rubber-like material about the flattened lining, a pair of presser rolls for engaging the coated lining and advancing it from the extruding head, a tank of liquid dispersed dusting material, and means for advancing the coated liner through said liquid dispersed material at the same speed as it is delivered thereto by said presser rolls.

EDWARD A. DAVIS.